United States Patent [19]

Ulbrich et al.

[11] Patent Number: 4,675,837

[45] Date of Patent: Jun. 23, 1987

[54] DIGITAL ARITHMETIC UNIT HAVING SHORTENED PROCESSING TIME AND A SIMPLIFIED STRUCTURE

[75] Inventors: Walter Ulbrich, Puchheim; Alois Rainer; Tobias Noll, both of Munich, all of Fed. Rep. of Germany

[73] Assignee: Siemens Aktiengesellschaft, Berlin and Munich, Fed. Rep. of Germany

[21] Appl. No.: 619,185

[22] Filed: Jun. 11, 1984

[30] Foreign Application Priority Data

Jun. 30, 1983 [DE] Fed. Rep. of Germany ....... 3323607

[51] Int. Cl.$^4$ .............................................. G06F 7/52
[52] U.S. Cl. .................................................... 364/788
[58] Field of Search ......................................... 364/788

[56] References Cited

U.S. PATENT DOCUMENTS

| | | | |
|---|---|---|---|
| 3,100,835 | 8/1963 | Bedrij | 364/788 |
| 3,316,393 | 4/1967 | Ruthazer | 364/788 |
| 4,139,894 | 2/1979 | Reitsma | 364/788 |
| 4,525,797 | 6/1985 | Holden | 364/788 |
| 4,573,137 | 2/1986 | Ohhashi | 364/788 |

OTHER PUBLICATIONS

K. Reiss, H. Leidl and W. Spichall, "Integrierte Digital-bausteine", Verlag Siemens Aktiengesellschaft, Berlin and Munich, 1970, pp. 389-394.

"Microprocessors/Microcomputers" by D. D. Givone and R. P. Roeser, McGraw-Hill Book Company, New York, 1980, pp. 166-172.

Primary Examiner—David H. Malzahn
Attorney, Agent, or Firm—Hill, Van Santen, Steadman & Simpson

[57] ABSTRACT

A digital arithmetic unit useful in data processing digital circuits comprises a plurality of stages each having two half-adders combined into a full adder and a carry logic element. An objective is to shorten the processing time for the addition and subtraction of binary numbers. For this purpose, the stages are divided into at least two groups and two separate carry paths are provided within each group. One of the carry paths is only switched on by means of selection logic elements. The activation occurs sequentially in group-wise fashion after simultaneous carry runs in all carry paths. The advantage particularly consists of the chronological coincidence of the carry runs in all groups.

11 Claims, 3 Drawing Figures

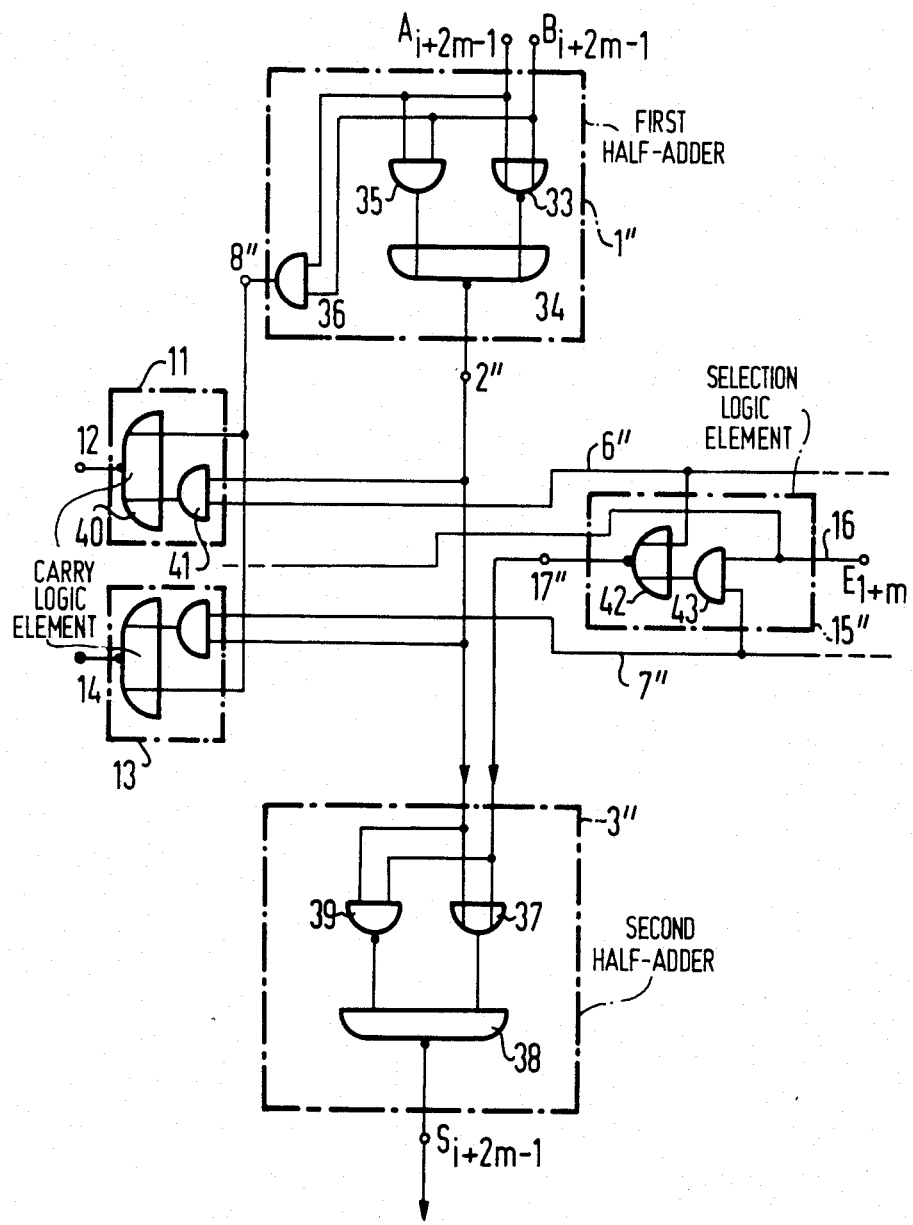

DIGITAL ARITHMETIC UNIT HAVING SHORTENED PROCESSING TIME AND A SIMPLIFIED STRUCTURE

BACKGROUND OF THE INVENTION

The invention relates to a digital arithmetic unit formed of a plurality of stages each having two half-adders combined into a full adder and a carry logic element which forms a carry from carries of half-adders to be supplied to a respective adjacent higher-order stage.

Arithmetic units of this type are known from the book by K. Reiss, H. Leidl and W. Spichall "Integrierte Digitalbausteine", Verlag Siemens Aktiengesellschaft, Berlin and Munich, 1970, pages 389–394, incorporated herein by reference. Their relatively low processing speed, however, is disadvantageous.

Shorter processing times are achieved with arithmetic units that function on the "carry-look-ahead" principle that is disclosed in the book "Microprocessors/Microcomputers" by D. D. Givone and R. P. Roeser, McGraw-Hill Book Company, New York 1980, pages 166–172, incorporated herein by reference. The N stages of an adder are preferably combined into respective K-place groups, whereby pre-calculated carries are supplied in parallel to the lowest order stages of all groups, said precalculated carries being formed in a carry generator from the input carry of the adder and the bits to be added. The carries between the individual stages of a group are then generally formed in the stages themselves. The carry generator, however, requires a considerable circuit expense which increases sharply with the desired processing speed and the processing width of the adder. An increase in the dissipated power and an increase in the circuit capacitances are also connected with these techniques.

SUMMARY OF THE INVENTION

An object of the invention is to specify an arithmetic unit of the type initially cited wherein a shortening of the processing time is achievable with a considerably lower added circuit expense than is the case given an arithmetic unit working on this principle. This is inventively achieved by means of a design of the arithmetic unit wherein the stages are divided into at least two groups. First and second separate carry paths are provided within at least one group. The carry paths extend over all stages of the group and contain the respective carry logic element in each stage. The first of the carry paths has first means for taking into consideration a prescribed input carry "0" supplied to a lowest-order stage of the group. The second of the carry paths has second means for taking into consideration a corresponding prescribed input carry "1". Both carry logic elements of each stage are connected via a selection logic element to the one-half-adder of the respective adjacent higher-order stage. Within one group, all selection logic elements allocated to the group are connected for driving over a shared selection line.

The advantage attainable with the invention particularly is that the added expense required for shortening the processing time consists essentially of only an additional carry path per group, i.e. of an additional carry logic element per stage and of an additional selection logic element per stage.

BRIEF DESCRIPTION OF THE DRAWINGS

FIG. 3 is a technical circuit model of a stage of the arithmetic unit according to FIG. 1.

DESCRIPTION OF THE PREFERRED EMBODIMENTS

Figure 1:
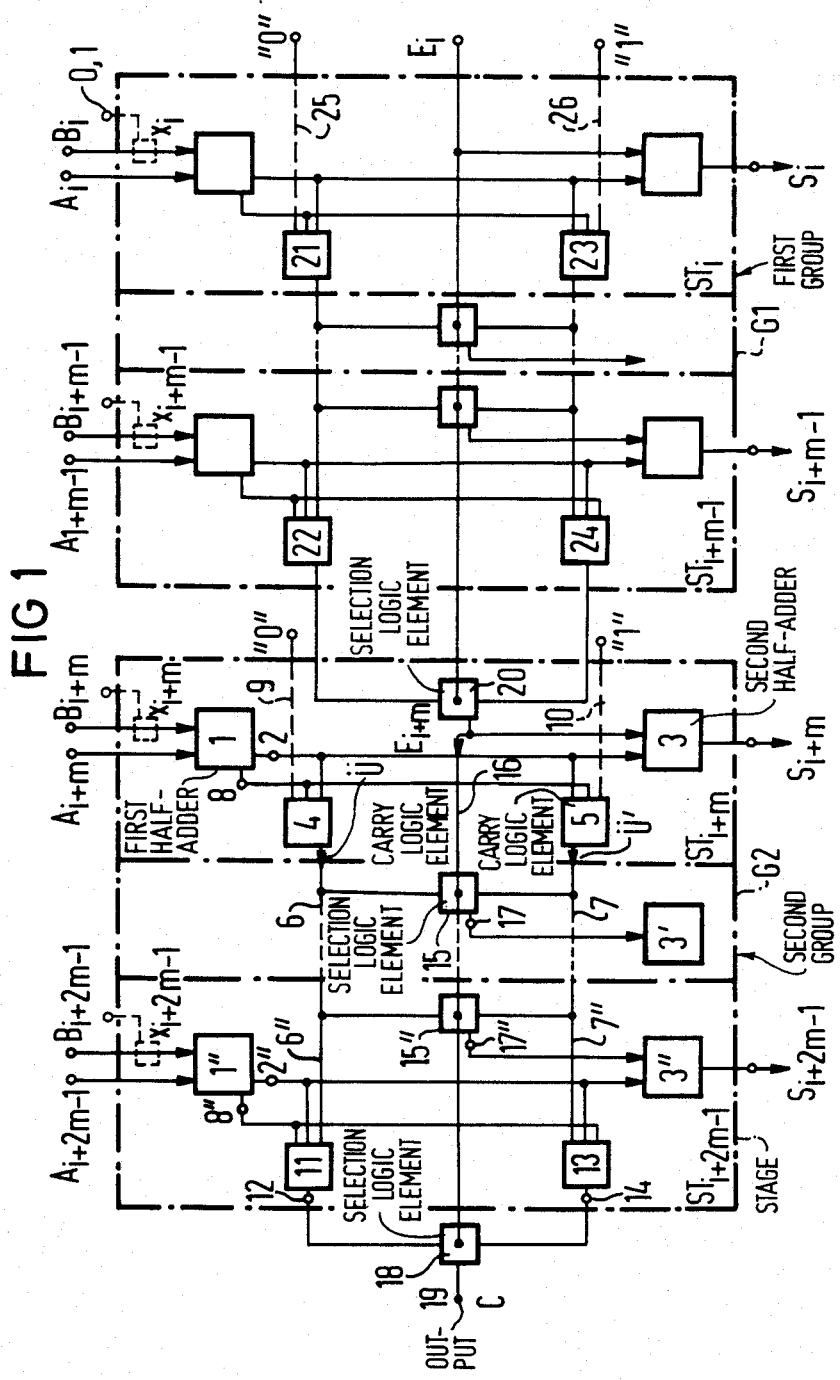
FIG. 1 is a block diagram of a multi-stage arithmetic unit designed according to the invention.

FIG. 1 shows a digital arithmetic unit consisting of 2m stages and having the form of an adder which executes a parallel addition of two respective 2m-place binary numbers A and B. The m stages $ST_i$ through $ST_{i+m-1}$ are thus combined into a first group G1, whereas further m stages $ST_{i+m}$ through $ST_{i+2m-1}$ form a second group G2. Each stage, for example $ST_{i+m}$, consists of a full adder which adds two bits, for example $A_{i+m}$ and $B_{i+m}$, of the numbers A and B into a sum, for example $S_{i+m}$, upon consideration of the carry supplied from the preceding stage and simultaneously forms two carries that are supplied to the adjacent, higher-order stage.

In detail, the stage $ST_{i+m}$ exhibits a first half-adder 1 whose inputs are wired with the bits $A_{i+m}$ and $B_{i+m}$. An intermediate sum tappable at the output 2 of half-adder 1 is supplied to the first input of a second half-adder 3 at whose second input a carry $E_{i+m}$ from the adjacent stage $ST_{i+m-1}$ of lower order is present. A sum $S_{i+m}$ allocated to the place value i+m is formed in the half-adder 3 from the carry $E_{i+m}$ and the intermediate sum. The sums $S_i$ through $S_{i+2m-1}$ output from all stages represent the 2m-place addition result, whereby the input-side carry at the stage $ST_i$ is referenced $E_i$ and the output-side carry at the stage $ST_{i+2m-1}$ is referenced $C_{aus}$.

Two separate carries U and U' are formed in the stage $ST_{i+m}$ by means of two carry logic elements 4 and 5, said carries U and U' being supplied to the corresponding carry logic elements of the adjacent, higher-order stage $ST_{i+m+1}$ via lines 6 and 7. Mutually corresponding, first inputs of the circuits 4 and 5 are thus connected to the output 8 of the half-adder 1 at which the carry formed therein appears. Second inputs of the circuits 4 and 5 which likewise mutually correspond are connected to the output 2 of the half-adder 1. The carry logic element 4 is designed such that a phantom carry "0" which one can imagine as having been supplied from the stage $ST_{i+m-1}$ is taken into consideration in the formation of the carry U. This is indicated in FIG. 1 by means of a dotted line 9 occupied with a "0" which is connected to a further input of the element 4. For differentiation therefrom, the carry logic element 5 is designed such that it takes a phantom "1" which one can imagine as having been supplied from the stage $ST_{i+m-1}$ into consideration in the formation of the carry U. This is indicated in FIG. 1 by means of a dotted line 10 occupied with a "1" that is connected to a further input of the element 5.

The remaining stages of the group G2 shown in FIG. 1 are designed analogous to $ST_{i+m}$. The carry logic element 4 together with the corresponding carry logic elements of the higher-order stages including the carry logic element 11 of the stage $ST_{i+2m=1}$ and together with the lines, for example 6, interconnecting these with one another form a first carry path of the group G2 whose output coincides with the output of 11. Together with the corresponding carry logic elements of the higher-order stages including the carry logic element 13 of the stage $ST_{i+2m-1}$ and together with the lines, for example 7, interconnecting these with one another, the carry logic element 5 forms a second carry path of the group G2 whose output 14 coincides with the output of 13.

A selection logic element 15 that is provided with three inputs is allocated to the carry logic elements 4 and 5 of the stage $ST_{i+m}$. Of these three inputs, the first two are respectively connected to the outputs of elements 4 and 5, whereas the third is wired to a selection line 16. One output 17 is connected to the carry input of the second half-adder (referenced 3' in FIG. 1) of the stage $ST_{i+m+1}$ which corresponds to the half-adder 3. Generally, the two carry logic elements of each stage have a selection logic element allocated to them in the described manner, whereby its output is respectively conducted to the carry input of the second half-adder of the adjacent, higher-order stage. The carry $C_{aus}$ is taken at the output 19 of the selection logic element 18 allocated to the carry logic elements 11 and 13.

All of the selection logic elements 15 ... 18 allocated to the stages $ST_{i+m}$ through $ST_{i+2m-1}$ are driven in common over the selection line 16, whereby the control occurs as a function of the carry $E_{i+m}$ which is supplied to the stage $ST_{i+m}$ proceeding from the adjacent, lower-order stage. The carry $E_{i+m}$ *thus simultaneously represents a control signal communicated to the selection line* 16. *All selection logic elements of G2 are driven into a first switching status by a carry $E_{i+m}=0$* in which they respectively connect through the carry logic elements of the first carry path to the carry inputs of the second half-adders of the adjacent, higher-order stages or connect through the output 12 to the output 19 of the group G2 (in the case of element 18). Upon appearance of a carry $E_{i+m}=1$, the selection logic elements of the group G2 proceed into a second switching status in which they respectively connect through the carry logic elements of the second carry path to the carry inputs of the second half-adders of the adjacent, higher-order stages or connect through the output 14 to the output 19 of the group G2 (in the case of element 18).

The group G1 comprising the stages $ST_i$ through $ST_{i+m-1}$ is essentially constructed analogous to G2. The difference merely exists that the lowest-order stage $ST_i$ is directly supplied with an input-side carry $E_i$, i.e. not via a selection logic element, whereas the corresponding stage $ST_{i+m}$ of G2 receives its input-side carry $E_{i+m}$ via a selection logic element 20 that is allocated to the highest-order stage $ST_{i+m-1}$ of G1. A first carry path which encompasses the carry logic elements 21 ... 22 and a second carry path comprising the carry logic elements 23 ... 24 are also provided in G1, whereby a phantom, input-side carry "0" is taken into consideration in the element 21, this being indicated by the dashed line 25, whereas a phantom, input-side carry "1" is taken into consideration in the element 23, this being indicated by a dashed line 26.

In operation, the group G1 adds the individual bits of the numbers A and B supplied to it, whereas the group G2 simultaneously processes the bits of A and B supplied to it in a corresponding manner. Simultaneous carry runs occur in the total of four carry paths of the groups G1 and G2, namely from the respectively lowest-order to the highest-order stages, whereby the carries formed in the elements 4 and 21 respectively take a phantom, input-side carry "0" into consideration. The carries formed in the elements 5 and 23 respectively proceed from a phantom, input-side carry "1". The carries formed within the individual carry paths also result from the bits supplied to the individual stages, respectively deriving in the sense of a normal carry run.

After the conclusion of these four carry runs, carries are available at the outputs of all carry logic elements, including the elements 22, 24, 11, and 13. Subsequent thereto, the lowest-order stage $ST_i$ is supplied with the actual input-side carry $E_i$ by means of which—within the group G1—either all carry logic elements 21 ... 22 of the first carry path (given $E_i=0$) or all carry logic elements 23 ... 24 of the second carry path (given $E_i=1$) are connected through to the outputs of the selection logic elements allocated to them, so that the carry inputs of the second half-adders of the individual stages are charged with the carries of the first or of the second carry path. In accordance with the switching status assumed by the selection logic element 20, the carry $E_{i+m}$ is selected from the two carries formed in the elements 22 and 24 and is supplied to the shared drive line 16, as a result whereof all selection logic elements 15 ... 18 of the second group G2 connect through either all carry logic elements 4 ... 11 of the first carry path (given $E_{i+m}=0$) or all carry logic elements 5 ... 13 of the second carry path (given $E_{i+m}=1$) to the outputs of the selection logic elements allocated to them. The carry inputs of the second half-adders of the individual stages are again charged with the carries respectively formed in the first or second carry path of G2. The required carries result for the second half-adders of the individual stages by means of the group-wise selection of the carries from the respective first or second carry paths, so that the sums $S_i$ through $S_{i+2m-1}$ which represent the addition result can be formed. At the same time, the carry $C_{aus}$ is also available at the output 19.

The addition time T of an adder according to FIG. 1 is composed of a first component t1 which corresponds to the addition time of a m-stage group, for example G1, of a second component t2 that specifies the switching time of the selection logic element 20, and of a third component t3 that consists of the throughput time of the selection logic element 18. The relationship $T=t1+t2+t3$ thus applies. Since t1 is only related to a single m-stage group despite the total of 2m stages, a significantly shorter addition time T results than in the case of a traditional adder design having a single carry run across all 2m stages.

When further groups G3 through GK which are respectively constructed in accordance with G2 are provided in FIG. 1, then the addition time T is increased only to such degree that the component t2 is to be multiplied by the factor $(K-1)$. The components t1 and t3 thus remain unaltered; i.e., a significantly higher increase of the operating speed is achieved given a greater word width K m of the numbers A and B to be added in comparison to the traditional adder design having a single carry run across all K m stages.

Figure 2:
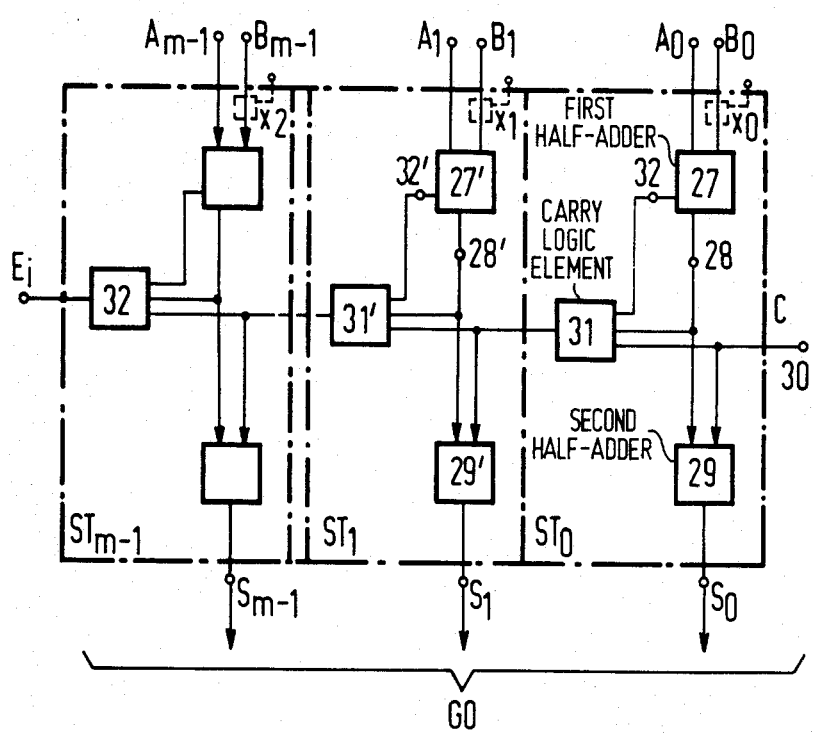
FIG. 2 is a block diagram of a number of further stages that are preconnected to the stages shown in FIG. 1.

It is preferred according to a further development of the invention to design the group which contains the lowest-order stage more simply than G1 in FIG. 1. FIG. 2 serves the purpose of explaining this further development, showing such a simplified, lowest-order group G0. It is thus presumed that G0 precedes the group G1 of FIG. 1 and that the lowest-order stage of the adder no longer consists of the stage $ST_i$ but of the stage $ST_0$ which represents the first stage of the group GO which encompasses a total of m stages. As shown in FIG. 2, the individual stages of GO are designed identical to one another. They respectively exhibit a first half-adder, for example 27, whose inputs have allocated bits, for example $A_0$ and $B_0$, of the binary numbers A and B. An intermediate sum 28 is supplied to a second half-adder, whereby an input-side carry is likewise communicated thereto. In the case of the stage $ST_0$, this carry—which is supplied via a terminal 30—is referenced $C_{ein}$. A carry logic element 31 whose inputs are connected to the carry output 32 of the half-adder 27, to the output 28, and to the terminal 30 forms the carry of the stage $ST_0$ and conducts this both to the carry logic element 31' as well as to the second half-adder 29' of the following stage $ST_s$ of the group GO. The remaining sub-circuits of the stage $ST_1$ are provided with the same reference characters as the corresponding sub-circuits of $ST_0$, primes having merely been added thereto. The carry logic element 32 of the stage $ST_{m-1}$ forms the carry $E_i$ which is communicated to the stage $ST_i$ of FIG. 1.

Together with the lines connecting them to one another, the carry logic elements 31 ... 32 form a single carry path, in contrast to the double carry paths of the respectively employed groups G1 through GK. The partial sums $S_0$ through $S_{m-1}$ allocated to the individual places of the group GO are tappable at the sum outputs of the stages $ST_0$ through $ST_{m-1}$. Since the addition time of the group GO corresponds to the addition times of the remaining groups and coincides with them, the addition time of the adder consisting of the stages G1 and G2 or of G1 through GK remains and is not increased by the addition of GO. When, upon omission of G2, the adder consists only of the stages G1 and GO, then the addition time T is reduced to the value t1+t3, whereby t3 denotes the switching time of the element 20.

It is preferable given an embodiment of the adder comprising the groups G1 through GK to provide one or more of the higher-order groups, for example GK, with a greater number of stages than the lower-order groups, for example G1. This increase in the number of stages is permissible because the connection through of the respective selection logic elements allocated to the highest-order stages of the individual groups ensues sequentially and the time span required for this for all groups up to and including the group $G(K-1)$ amounts, for example, to $(K-2)t2$. However, the addition time for the group GK can be increased by this time span. In other words, the number of stages for GK can be correspondingly increased. Given a prescribed number of stages N of the adder, the plurality K of groups can be reduced by means of such a technique, this denoting a further reduction in the addition time T.

The circuit design according to the invention allows a noticeable increase in the operating speed of an adder insofar as the total number of stages thereof lies above 8 to 10.

FIG. 3 shows a preferred embodiment of the stage $ST_{i+2m-1}$ of the adder according to FIG. 1 wherein the remaining stages are preferably correspondingly designed. Only the lowest-order stages of the individual groups show slight departures therefrom in the region of the illustrated selection logic element, but these can be derived from FIG. 1.

In detail, the first half-adder 1" of the stage $ST_{i+2m-1}$ consists of an input-side NOR element 33 whose inputs have the bits $A_{i+2m-1}$ and $B_{i+2m-1}$ to be added. The output thereof is connected to the first input of a second NOR element 34 whose output represents the output 2" of the half-adder. The second input of 34 is wired to the output of the AND element 35 whose inputs are connected parallel to the inputs of 33. An AND element 36 is also provided, its inputs being likewise connected parallel to the inputs of 33 and its output forming the carry output 8". The second half-adder 3" is provided with an OR element 37 whose inputs are wired to the outputs 2" of 1" and 17" of the selection logic element 15" of the stage $ST_{i+2m-2}$, and whose output is conducted to the first input of a NAND element 38. The second input of 38 is then connected to the output of a NAND element 39 whose inputs are connected parallel to the inputs of 37. The output of 38 represents the sum output of the stage $ST_{i+2m-1}$.

The carry logic element 11 consists of a NOR element 40 whose first input is connected to the output 8" and whose second input follows the output of an AND element 41 whose inputs are connected to the output 2" and to the line 6". 6" connects those carry logic elements of the stages $ST_{i+2m-2}$ and $ST_{i+2m-1}$ that lie in the first carry path of the group G2. The output of 40 forms the output 12 of the circuit 11. The carry logic element 13 exhibits a corresponding format. The line 6" is merely replaced by the line 7" which connects those carry logic elements of the stages $ST_{i+2m-2}$ and $ST_{i+2m-1}$ that lie in the second carry path of the group G2. Output 12 is replaced by the output 14.

The selection logic element 15" is comprised of a NOR element 42 whose first input is connected to the output of an AND element 43 whose two inputs are respectively connected to the selection line 16 and to the line 7". The second input of 42 is wired to the line 6", whereas the output of 42 forms the output 17" of element 15".

Insofar as they are contained in FIG. 1, the circuit parts explained with reference to FIG. 3 are provided with the same reference characters.

The arithmetic unit described above can also be used for the subtraction A minus B of the binary numbers A,B existing in two's complement representation. All bits $B_i$ are supplied inverted and the carry $E_i$ of $C_{ein}$ supplied to the lowest-order stage consists of a "1". When a change-over adder/subtractor is desired, the bits $B_i$ are applied to the first inputs of EXOR elements $X_0$ through $X_{i+2m-1}$ to whose second inputs the signal "0" (for the addition) or "1" (for the subtraction) is respectively applied. The outputs of $X_0$ through $X_{i+2m-1}$ are applied to those inputs of the first half-adder, for example 1, 27, or 27', that are provided for B. The EXOR elements can be designed in accordance with the block 3" in FIG. 3.

Although various minor changes and modifications might be proposed by those skilled in the art, it will be understood that we wish to include within the claims of the patent warranted hereon all such changes and modifications as reasonably come within our contribution to the art.

We claim as our invention:

1. A digital arithmetic unit, comprising:
   a plurality of series-connected stages;
   each stage having first and second half-adders connected together by an output from the first half-adder to the second half-adder, first and second carry logic element means respectively connected to outputs of the first half-adder and which each form a respective carry from said first half-adder to be supplied to a following selection element logic means following after each stage;

the stages being divided into at least two groups;

first and second separate carry paths being provided within at least one of said two groups, said first and second carry paths each extending over all stages of said group, the first path being formed of a series connection of the first carry logic element means in each stage, and the second path being formed of a series connection of the second carry logic element means in each stage;

the first carry path having first means connected thereto at a lowest order stage of said one group for taking into consideration a prescribed input carry "0" supplied to this lowest-order stage, and the second of said carry paths having second means connected thereto at said one group lowest-order stage for taking into consideration a corresponding prescribed input carry "1" supplied to this lowest-order stage;

each stage of said at least one group having a selection logic element means connected to outputs of the first and second carry logic element means of a previous stage and also having an output connected to the second half-adder of each stage; and within said at least one group, said selection logic element means in each stage being connected for driving over a shared selection line except for the selection logic element means in a first stage at an input of the group.

2. A digital arithmetic unit according to claim 1 wherein the carry logic element means forming the first and second carry paths form a carry that is supplied to an adajcent, higher-order stage, each of the carry logic element means lying in the first or second carry paths forming the carry as a function of a carry supplied to it from an adjacent, lower-order stage via the first or second carry path.

3. A digital arithmetic unit according to claim 1 wherein both carry logic element means provided in each stage are connected parallel to one another via first inputs to a carry output of the first half-adder and via second inputs to a sum output of the first half-adder.

4. A digital arithmetic unit according to claim 1 wherein the shared selection line of said at least one group is connected to the second half-adder of said lowest-order stage of said at least one group.

5. A digital arithmetic unit according to claim 1 wherein said first and second means provide that in a first switching status, all selection logic element means allocated to said at least one group only connect carry logic element means of the first carry path to the half-adders of a following adjacent, higher-order stage and, in a second switching status, only connect the carry logic circuit means of the second carry path to the half-adders of the following adjacent, higher-order stage, said first switching status existing given application of a carry "0" to the lowest-order stage of the at least one group and the second switching status existing given application of a carry "1" to the lowest-order stage of the at least one group.

6. A digital arithmetic unit according to claim 5 wherein the selection logic element means comprises an AND element whose first input connects to the selection line and whose second input connects to the second carry path, and a NOR element whose first input is connected to the first carry path and whose second input connects to an output of the AND element.

7. A digital arithmetic unit according to claim 1 wherein at least one of said two groups is formed of relatively higher-order stages than the other group and has a larger number of stages than the other group formed of lower-order stages.

8. A digital arithmetic unit according to claim 1 wherein for execution of a subtraction A minus B of two binary numbers A, B existing in two's complement representation, bits $A_i$ are supplied to first inputs of the first half-adders of the stages and inverted bits $B_i$ are supplied to second inputs of the first half-adders, and a lowest-order stage being connected to an input-side carry "1".

9. A digtal arithmetic unit according to claim 1 wherein a respective EXOR element has its output connected to second inputs of the first half-adders of the individual stages, first inputs of said EXOR elements being connected with bits of a binary number B, first inputs of the first half-adders being connected with bits of a second binary number A, and second inputs of said EXOR elements being connected with a "0" for execution of an addition of A and B and being connected with a "1" for execution of a subtraction A minus B.

10. A digital arithmetic unit, comprising:

a plurality of series-connected stages;

each stage having first and second half-adders connected together by an output from the first half-adder to the second half-adder, each half-adder having a first input for receiving bits of a first type and a second input for receiving bits of a second type, first and second carry logic element means respectively connected following the first half-adder and which each form a respective carry from said first half-adder to be supplied to a following selection element logic means following after said stage;

the stages being divided into at least two groups;

first and second separate carry paths being provided within at least one of said two groups, said first and second carry paths each extending over all stages of said group, the first path being formed of a series connection of the first carry logic element means in each stage, and the second path being formed of a series connection of the second carry logic element means in each stage;

the first carry path having first means connected thereto at a lowest order stage of said one group for taking into consideration a first prescribed input carry supplied to this lowest-order stage, and the second of said carry paths having second means connected thereto at said one group lowest-order stage for taking into consideration a corresponding second prescribed input carry supplied to this lowest-order stage, and the second path being formed of a series connection of the second carry logic element means in each stage;

each stage of said at least one group having said selection logic element means connected to outputs of the first and second carry logic element means of a previous stage and also having an output connected to the second half-adder of each stage; and within said at least one group, said selection logic element means in each stage being connected for driving over a shared selection line except for the selection logic element means in a first stage at an input of the group.

11. A digital arithmetic unit according to claim 10 wherein said first and second means comprise respective first or second carry logic element means having an additional input for a carry "0" and a carry "1".

* * * * *